United States Patent
Nguyen et al.

(10) Patent No.: US 7,346,132 B2
(45) Date of Patent: Mar. 18, 2008

(54) METHOD FOR TRANSMITTING SIGNALLING INFORMATION BETWEEN AN ACCESS POINT AND A TERMINAL OF A MULTI-CARRIER RADIO COMMUNICATION NETWORK

(75) Inventors: Hang Nguyen, Clichy-la-Garenne (FR); Thierry Lestable, Paris (FR); Jérôme Brouet, Paris (FR)

(73) Assignee: Alcatel, Paris (FR)

( * ) Notice: Subject to any disclaimer, the term of this patent is extended or adjusted under 35 U.S.C. 154(b) by 634 days.

(21) Appl. No.: 10/849,125

(22) Filed: May 20, 2004

(65) Prior Publication Data

US 2004/0253960 A1    Dec. 16, 2004

(30) Foreign Application Priority Data

Jun. 16, 2003 (EP) ................... 03291439

(51) Int. Cl.
*H04L 27/06* (2006.01)
(52) U.S. Cl. ............. 375/343; 375/240; 375/260
(58) Field of Classification Search ........... 375/240, 375/240.02, 240.23, 343, 253, 260; 382/244–246
See application file for complete search history.

(56) References Cited

U.S. PATENT DOCUMENTS

| | | | |
|---|---|---|---|
| 5,243,629 A * | 9/1993 | Wei | 375/299 |
| 6,301,308 B1 | 10/2001 | Rector | |
| 6,751,256 B1 * | 6/2004 | Nickel | 375/240.01 |
| 6,754,433 B2 * | 6/2004 | Hurley et al. | 386/46 |
| 6,895,047 B2 * | 5/2005 | Shiro | 375/240.01 |
| 2002/0119781 A1 | 8/2002 | Li et al. | |

FOREIGN PATENT DOCUMENTS

FR  2 799 596 A1   4/2001

OTHER PUBLICATIONS

Chengjie Tu et al: "Adaptive runlength coding" IEEE Signal Processing Letters, Mar. 2003, IEEE, USA, vol. 10, No. 3, pp. 61-64, XP002262273.
Eude T et al: Medical images compression using statistical model for transmission and archiving: Information Theory, 1994. Proceedings, 1994 IEEE International Symposium on Trondheim, Norway Jun. 27-Jul. 1, 1994, New York, NY, USA, IEEE, Jun. 27, 1994, p. 422, XP010135269.

* cited by examiner

*Primary Examiner*—Khanh C. Tran
(74) *Attorney, Agent, or Firm*—Sughrue Mion, PLLC

(57) ABSTRACT

The present invention relates to a method for transmitting signaling information between an access point and a terminal of a multi-carrier radio communication network, said signaling information comprising information related to the different sub-carriers (and being transmitted on one pre-defined sub-carrier) according to the present invention, the method comprises the steps of performing a de-correlation transformation on said signaling information by exploiting the correlation between at least two sub carriers and applying an entropy compression on said de-correlated signaling information.

9 Claims, 2 Drawing Sheets

METHOD FOR TRANSMITTING SIGNALLING INFORMATION BETWEEN AN ACCESS POINT AND A TERMINAL OF A MULTI-CARRIER RADIO COMMUNICATION NETWORK

The invention is based on a priority application EP 03 291 439.2 which is hereby incorporated by reference.

BACKGROUND OF THE INVENTION

The present invention relates to a method for transmitting signaling information between an access point and a terminal of a multi-carrier radio communication network.

New generations transmission systems, such as 3-G or 4-G radio communication systems, need to transmit a lot of measures, metrics, commands or signaling information between the access points of the radio communication system and the mobile terminals. The load of these signaling information increases as the capacity of the transmission systems increases (more users, more available bandwidth . . . ).

Especially in multi-carriers system, a lot of information (measures, signaling, commands, metrics . . . ) for each sub-carrier are exchanged between the access point and the mobile terminal. Such multi-carrier transmission is provided in OFDM 2.4 GHz systems, in extensions of IEEE 802.11a HyperLAN2 system for example. In some systems, there can be up to thousands of sub-carriers. Usually, a certain amount of sub-carriers are used for transmitting the signaling information related to the traffic sub-carriers. The signaling information is represented in form of a signaling vector, the components of which indicate the signaling data for the different sub-carriers.

Bit loading techniques are usually employed to enhance multi-carrier systems. For each transmission time interval, a new state vector describing the distribution of the bits on the sub-carriers has to be sent to the receiver to that it can demodulate the signal using appropriate schemes for each sub-carrier. This has the consequence to increase quickly the signaling load since this state vector contains lots of data (for each sub-carrier, e.g. the modulation type, the transmitted power, the FEC).

Additionally to bit loading signaling, channel measures taken by mobile terminals and transmitted in the uplink up to the access point, or signaling information related to OFDMA are bandwidth consuming signaling which limit the amount of user data.

A particular object of the present invention is to find mechanisms that might significantly reduce the signaling load in a multi-carrier radio communication network.

Another object of the invention is to provide a terminal and an access point of a multi carrier radio communication network implementing these mechanisms.

SUMMARY OF THE INVENTION

These objects, and others that appear below, are achieved by a method for transmitting signaling information between an access point and a terminal of a multi-carrier radio communication network said signaling information comprising information related to the different sub-carriers, said method comprising the steps of:
  performing a de-correlation transformation on said signaling information by exploiting the correlation between at least two sub carriers;
  applying an entropy compression on said de-correlated signaling information.

This object is further achieved by a corresponding access point of a multi-carrier radio communication network adapted to exchange signaling information with a terminal, said access point comprising:
  means for performing a de-correlation transformation on said signaling information by exploiting the correlation between at least two sub carriers;
  means for applying an entropy compression on said de-correlated signaling information.

This object is further achieved by a corresponding terminal adapted to be used in a multi-carrier radio communication network and adapted to exchange signaling information with an access point of said multi-carrier radio communication network, said terminal comprising:
  means for performing a de-correlation transformation on said signaling information by exploiting the correlation between at least two sub carriers;
  means for applying an entropy compression on said de-correlated signaling information.

According to the present invention, the redundancy inside the signaling data due to correlation between adjacent sub-carriers of the multi-carrier radio communication network is used to compress the signaling information. For example time correlation due to Doppler effect or frequency correlation due to multi path delay spread are usual type of correlation between different sub-carriers in a multi-carrier radio communication system.

In a preferred embodiment of the present invention, the method according to the invention is applied to bit loading vectors.

Preferably, the de-correlation is obtained by applying a discrete cosine transform to the signaling information Preferably, the different levels of correlation (time and/or frequency and/or space) are taken into account.

In further preferred embodiments of the present invention, a quantification step is added between the de-correlation and compression steps in order to cope with not integer signaling data.

The method according to the present invention presents the advantage to reduce the high signaling load in multi-carrier radio communication networks while not degrading the signaling quality.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

An example for multi-carrier systems may be OFDM 2.4 GHz (Orthogonal Frequency Division Modulation) as HIPERLAN/2 or IEEE 802.11a communication networks.

N sub-carriers are available in the system and used between radio terminals and access points of the multi-carrier radio communication system. One or more pre-defined sub-carriers are used especially for transmitting signaling information related to the traffic sub-carriers.

Figure 1:
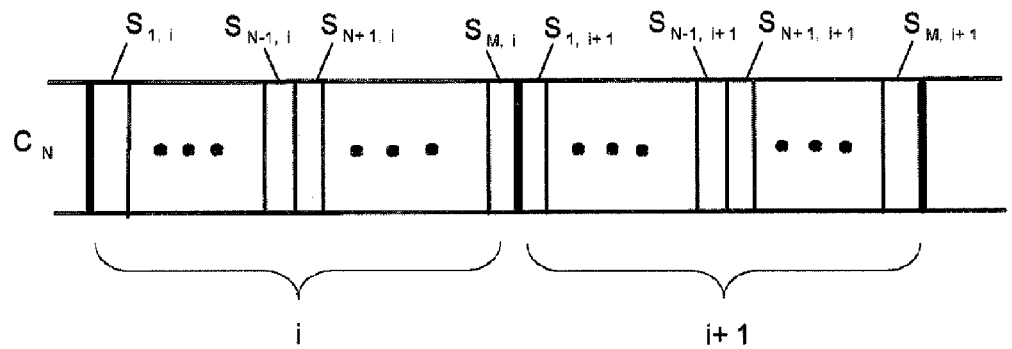
FIG. 1 shows a signaling information in the framework of a multi-carrier radio communication system.

FIG. 1 shows the organization of signaling information in the framework of an usual multi-carrier radio communication system.

Such signaling information may for example be bit loading vectors which comprise information on the modulation schemes used on the different sub-carriers in case of adaptive modulation scheme or source power bit loading vectors which comprise information on the source power used on the different sub-carriers.

Also channel measures taken by the mobile terminals on the different sub-carriers and transmitted in the uplink to the access point or usual OFDM signaling are also transmitted on the one or more predefined signaling sub-carriers.

In the example shown on FIG. 1, sub-carrier N is reserved for signaling information. The signaling information are arranged in consecutive frames i, i+1 transmitted on sub-carrier N, frame i, also called in the following signaling information vector i, comprises fields $S_{1,i}, \ldots S_{N-1,i}, S_{N+1,i}, \ldots, S_{M,i}$ with signaling information related respectively to the different non-signaling sub-carriers $C_1, \ldots C_{N-1}, C_{N+1}, \ldots, C_M$, M being the total amount of sub-carriers.

Figure 2:
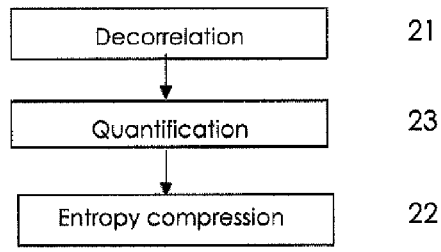
FIG. 2 details the method according to the present invention.

FIG. 2 details the method according to the present invention.

The method according to the present invention comprises following steps:

Step 21 consists in performing a de-correlation transformation on the signaling information by exploiting the correlation between at least two sub carriers.

Step 22 consists in applying an entropy compression on the de-correlated signaling information.

Optionally, a quantification step 23 can be performed if the signaling information are not integer data (e.g. if the signaling data are source power bit loading vectors which comprise an indication on the source power used on the different sub-carriers. The source power values are real numbers.) The quantification step is performed between step 21 and step 22.

In a preferred embodiment of the present invention, step 21 consists in performing a Discrete Cosine Transform on the signaling information in order to eliminate the redundancy due to correlation between adjacent sub-carriers. Algorithm detailing a Discrete Cosine Transform may be found for example in following documents "ITU-T Recommendation H.263", 03-96 or "Digital Video Processing", Murat Tekalp, Prentice Hall PTR, 1995.

Alternatively, step 21 may be performed in that time de-correlation is obtained by computing differences between successive signaling information related to the same sub-carrier. According to this embodiment, the differences $(S_{1,i+1}-S_{1,i}), \ldots, (S_{N-1,i+1}-S_{N-1,i}), (S_{N+1,i+1}-S_{N+1,i}), \ldots, (S_{M,i+1}-S_{M,i})$ are computed for two successive signaling information vectors. The difference to the preceding signaling information for each sub-carrier is transmitted instead of transmitting the signaling information themselves. Additionally to time de-correlation, frequency de-correlation can be performed in that difference between successive components related to adjacent sub-carriers are computed. According to this embodiment, $(S_{2,i}-S_{1,i}), \ldots, (S_{N-1,i}-S_{N-2,i}), (S_{N+2,i}-S_{N+1,i}), \ldots, (S_{M,i}-S_{M-1,i})$ are computed and transmitted instead of the signaling information themselves.

Step 21 advantageously comprises a step of selecting the dimension of the correlation between the signaling information. The correlation dimension being defined by the number of quantities which influence the correlation of the signaling information due to the correlation between the sub-carriers in the multi carrier radio communication system. The correlations are usually time correlation, frequency correlation, space correlation.

According to the present invention, the dimension of the correlation is advantageously depending on the coherence bandwidth and on the mobile terminal velocity. If the coherence bandwidth as defined in John G. Proakis, "Digital Communications", $3^{rd}$ Edition, McGraw-Hill Int.Ed. Eq. 14-1-16, p.764 is larger than a predefined number of sub-carriers (e.g. 8 or 16) and the mobile velocity is larger than a predefined velocity threshold (e.g. 1 to 2.5 m/s) the correlation dimension should be chosen equal to two. In this case, it is advantageous to perform time and frequency de-correlation.

Preferably, an adaptive system first checks if there is any change in the new bit loading vector:

If there is no change, only one bit in the signaling information message is set to indicate that no change happened and sent to the receiver. Instead of sending the whole signaling information vector, only one bit is needed.

If there are changes in the new signaling information compared with the previous one:

for large coherence bandwidths (i.e. 8 and 16 sub-carriers wide for the case of 802.11a):

for mobile velocity lower than a speed value "V" (V=1 m/s for the case of 802.11a), the time only de-correlation transform is used, for mobile velocity higher than the speed value "V" (V=1 m/s for the case of 802.11a), the time-frequency de-correlation transform is used.

for the other coherence bandwidths (less than 8 sub-carriers wide): the time only de-correlation transform is used.

In the following, the example of bit loading vector will be used for illustrating the present invention. It will however be understood by those skilled in the art that the method according to the present invention can be used for any signaling information in the framework of a multi-carrier radio communication system and especially for the type of signaling information cited above.

Preferably, if an error is detected in the transmitted compressed bit loading vector, a message will be send from the receiver to the transmitter. Then, for the next bit loading vector transmission, the transmitter will send a non-compressed bit loading vector.

This case is unlikely to happen because less bandwidth is needed to transmit the compressed signaling information. As a consequence, a better channel coding providing a higher error protection can be used.

Preferably, the compression rate can also be adopted with the channel state. For example, if the channel state is very bad, no compression or only frequency de-correlation compression is used. So each transmitted bit loading vector is independent. If an error appear, this erroneous signaling information is simply discarded without consequence on the next signaling information.

According to step 22, an entropy compression is performed on the de-correlated signaling information. Preferably, the entropy compression may be an Huffmann code, arithmetic code RVLC or U-VLC all belonging to the family of Variable Length Codes.

Preferably, a run-length entropy compression algorithm with the Universal Variable Length Code (UVLC) is the optimum pattern to get robust compressed data for a given compression rate.

Preferably, the algorithm is adapted as follows:

Only the non zero coefficients are encoded. The bit stream of the de-correlated signaling information is encoded by a couple (RUN, LEVEL) and by a codeword called End Of Block (EOB) when the end of the signaling information is reached. RUN parameter indicates the number of consecutive zero coefficients preceding the encoded coefficient. LEVEL parameter is the encoded coefficient itself.

The couple (RUN, LEVEL) can be encoded separately or together with any Variable Length Code.

If the signaling information consists in the bit loading vector resulting from usual bit loading algorithms (e.g. Hughes-Hartogs, Chow-Cioffi, Fisher a.s.o.), the compression chain (steps 21 to 22) provides an encoded version of the bit loading vector having a length smaller than the non-encoded version of it. The encoded bit loading vector is transmitted through the wireless channel towards each mobile terminal of the multi-carrier radio communication network. The method according to the invention enables it to reduce the high signaling load in multi carrier networks while ensuring a low bit error rate.

Figure 3:
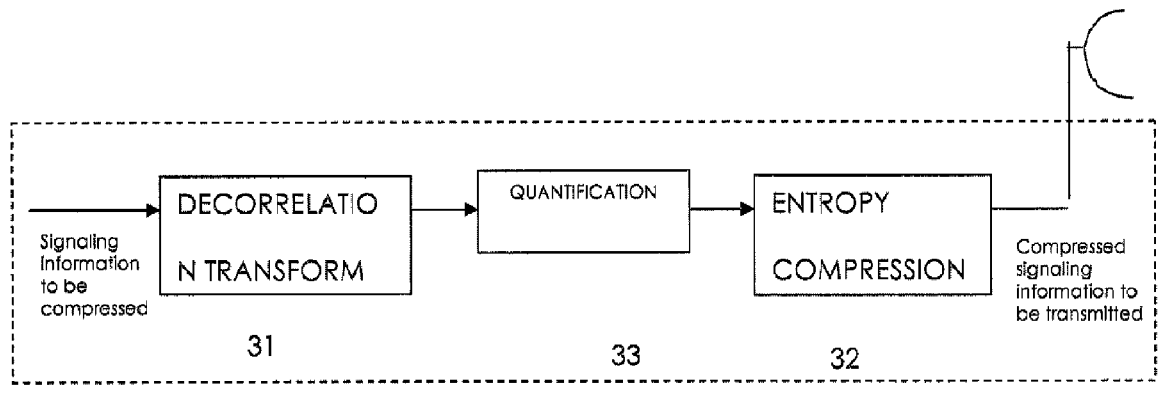
FIG. 3 shows a transmitter with a compression chain according to the present invention.

FIG. 3 shows a transmitter according to the present invention. The transmitter can be implemented in an access point of the multi carrier radio communication network or in a terminal (i.e. on both sides of the air interface).

A transmitter 30 according to the present invention comprises means 31 for performing a de-correlation transformation on signaling information, means 32 for applying an entropy compression on the signaling information. Means 31 for performing a de-correlation transformation are connected to means 32 for applying an entropy compression which are connected to the air interface output of transmitter 30.

Preferably, transmitter 30 additionally means 33 for quantifying the de-correlated signaling information. Means for quantifying the de-correlated signaling information are preferably used when the signaling information to transmit are non integer value. A quantification is required before the entropy compression. In this embodiment, means 31 for de-correlating are connected to means 33 for quantifying which are connected to means 32 for applying an entropy compression.

Figure 4:
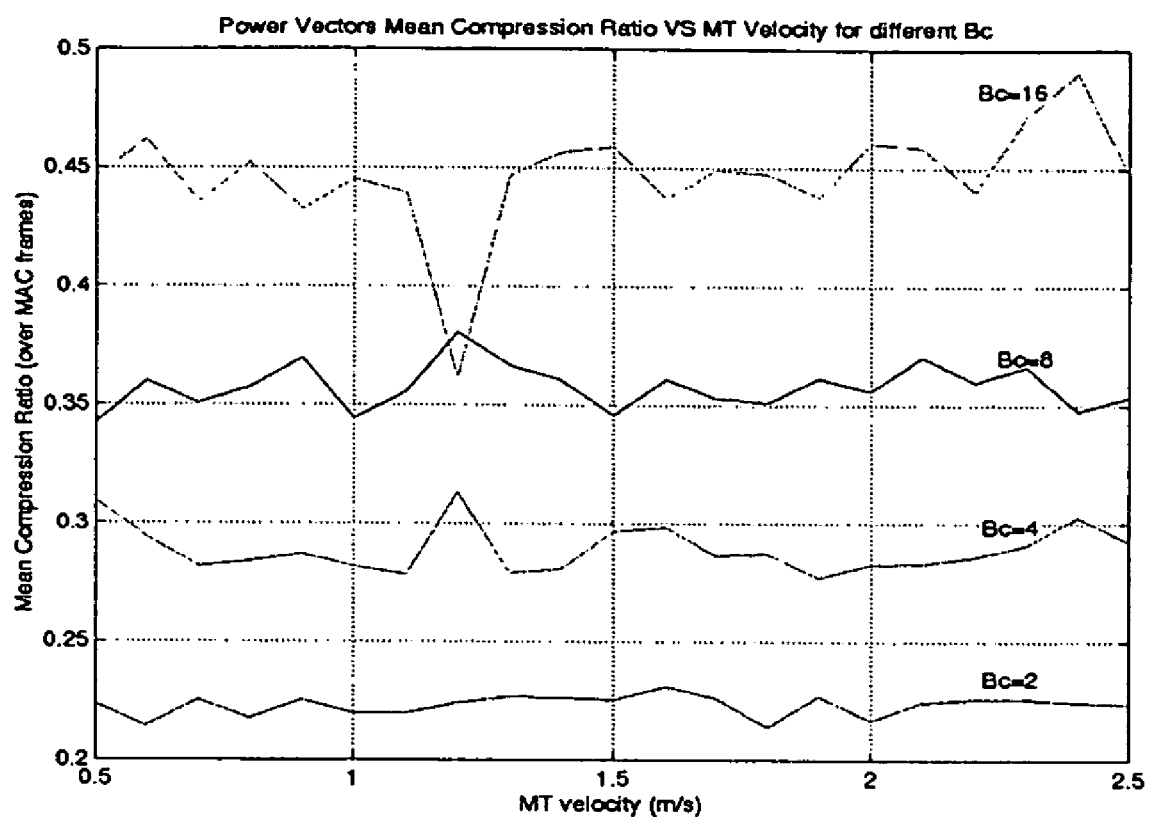
FIG. 4 shows simulation results obtained using the present invention.

FIG. 4 shows simulation results obtained using the present invention.

The efficiency of the method according to the present invention has been tested for the case of bit loading power vectors with HiperLAN/2 and IEEE 802.11a channels characteristics. Hereafter, results obtained for a nomadic Mobile Terminal Speed (1 mps), over a wireless channel with coherence bandwidth from 2 to 16 sub-carriers wide (total bandwidth=64 sub-carriers) shows that a mean compression rate from 22% to 45% is obtained. FIG. 4 shows that the wider the coherence bandwidth is, the more correlated the power vectors coefficients are, the more compressed the power vectors are.

The simulations shows that the difference between the bit loading power vector and the reconstructed power vector is quite small. The DCT transform is related to a projection on a cosine function basis. That's why the reconstructed power vector has more "oscillations" than the original one. This property is common to all the reconstructed vectors. As a consequence, it is advantageous to make a "smoothing" of the reconstructed vectors (i.e. to suppress the oscillations) in order to have less errors between the reconstructed vectors and the original ones.

The invention claimed is:

1. A method for transmitting signaling information between an access point and a terminal of a multi-carrier radio communication network, said signaling information comprising information related to the different sub-carriers and being transmitted on one predefined sub-carrier, said method comprising:
    performing a de-correlation transformation on said signaling information by exploiting the correlation between at least two sub carriers;
    applying an entropy compression on said de-correlated signaling information; wherein said de-correlation transformation comprises at least one of a time de-correlation transformation, a frequency de-correlation transformation, and a space de-correlation transformation, depending on at least one of a coherence bandwidth and a terminal velocity.

2. The method according to claim 1, wherein said de-correlation transformation is a discrete cosine transform.

3. The method according to claim 1, wherein:
    said performing said de-correlation transformation comprises computing differences between successive signaling information related to the same sub-carrier; and
    said de-correlated signaling information for said sub-carrier comprises one or more of said computed differences.

4. The method according to claim 3, further comprising:
    computing differences between components related to different sub-carriers inside said signaling information.

5. The method according to claim 1, wherein a quantification step is performed to said de-correlated signaling information before said entropy compression.

6. The method according to claim 1, wherein said signaling information comprises bit loading vectors in a multi-carrier radio communication network using an adaptive modulation scheme.

7. Method according to claim 1, wherein said correlation dimension is equal to two for a coherence bandwidth larger than a predefined number of sub-carriers and a terminal velocity larger than a predefined velocity threshold.

8. An access point of a multi-carrier radio communication network adapted to exchange signaling information with a terminal, said access point comprising:
    means for performing a de-correlation transformation on said signaling information by exploiting the correlation between at least two sub carriers;
    means for applying an entropy compression on said de-correlated signaling information;
    wherein said means for performing a de-correlation transformation are adapted to perform at least one of time-frequency- and space de-correlation, or any combination of at least two of said de-correlation types.

9. A terminal adapted to be used in a multi-carrier radio communication network and adapted to exchange signaling information with an access point of said multi-carrier radio communication network, said terminal comprising:
    means for performing a de-correlation transformation on said signaling information by exploiting the correlation between at least two sub carriers;

means for applying an entropy compression on said de-correlated signaling information;
wherein said means for performing a de-correlation transformation is adapted to perform at least one of time-
frequency- and space de-correlation, or any combination of at least two of these de-correlation types.

* * * * *